Patented July 2, 1935

2,006,762

UNITED STATES PATENT OFFICE 2,006,762

MANUFACTURE OF THIOUREA

Alphonse Gams and Werner Merki, Basel, Switzerland, assignors, by mesne assignments, to Ciba Products Corporation, Dover, Del.

No Drawing. Application July 26, 1932, Serial No. 624,901. In Switzerland, October 6, 1931

10 Claims. (Cl. 260—125)

It has already been proposed to make thiourea by treating an alkaline earth metal salt of cyanamide, preferably calcium cyanamide, in presence of water, with hydrogen sulfide or with an alkaline earth metal sulfide, such as, for instance, calcium or barium sulfide and an agent which, as for instance carbonic acid, sulfuric acid and the like, decomposes the alkaline earth compound or compounds employed with formation of an insoluble alkaline earth salt. This reaction which may for instance be represented by the following summary equations:

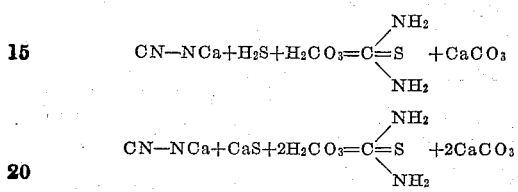

has been conducted either at the ordinary temperature and pressure or at a raised temperature with or without application of pressure.

However, the result of this procedure was hitherto not satisfactory. Either the yield was small or the period of reaction long or the formation of secondary products, especially dicyandiamide, considerable.

According to the present invention, these disadvantages of the known processes are avoided by a thorough grinding of the mixture brought to reaction. Such grinding was not performed in the known processes, the only method of conducting the reaction being a mere mixing or stirring operation; this is not effective because the insoluble alkaline earth metal salts produced by the reaction are precipitated on the surface of the solid starting materials and thus prevent further reaction, unless a higher temperature is employed and/or the operation is prolonged; these auxiliary conditions, however, lead to the formation of secondary products.

When, according to the invention, thorough grinding is adopted, for instance in a roller mill or ball mill, the reaction occurs in a very short time and quantitatively; secondary products are not formed. If desired, the reaction may be aided by application of gentle heat and pressure but these expedients are not generally necessary since the reaction proceeds without external application of heat and without pressure, both quickly and quantitatively.

In using for instance calcium cyanamide, the hydrogen sulfide is preferably conducted into a closed vessel, for example a tube mill or ball mill, in which the calcium cyanamide is being ground in a moist condition. The calcium sulfide produced, together with the thiourea, is then treated with an agent which forms an insoluble salt of calcium, for instance sulfuric acid, carbonic acid or phosphoric acid, or a soluble salt of one of these acids.

There may be passed into the apparatus from the beginning so much hydrogen sulfide as is necessary for the conversion of the total amide nitrogen into thiourea and the calcium into calcium sulfide. In this case the hydrogen sulfide liberated in the subsequent decomposition of the calcium sulfide may be used for making a further batch of thiourea. Alternatively, there may be introduced at the beginning only so much hydrogen sulfide that only a part of the amide nitrogen is converted into thiourea, the rest of the hydrogen sulfide being consumed in producing calcium sulfide. By decomposing the latter, the liberated hydrogen sulfide may be used for converting the rest of the amide nitrogen into thiourea.

An advantageous procedure consists in introducing into the apparatus simultaneously the hydrogen sulfide and the agent necessary for separating the calcium from the calcium cyanamide, for instance carbon dioxide; over-pressures higher than 1 atmosphere or the application of heat are not necessary for the process, since the action is exothermic. The complete change occupies 10–30 minutes according to the efficiency of the grinding device. The yield is almost quantitative in respect of the amide nitrogen.

The hydrogen sulfide may, as alluded to above, also be used in statu nascendi, viz. by employing alkaline earth sulfides, such as calcium, strontium or barium sulfide, and treating the same during the reaction with an agent which, on the one hand, sets free hydrogen sulfide, and, on the other hand, yields an insoluble salt with the earth alkali metal used, such as, for instance, carbonic acid, sulfuric acid, phosphoric acid or a soluble salt of one of these acids. Preferably for this purpose the same agent is used in correspondingly increased proportion, which serves for the decomposition of the alkaline earth metal salt of cyanamide. It is also advantageous to use the same salts of cyanamide and of hydrogen sulfide, the calcium salts being especially adapted.

For the purpose of the present process any suitable grinding device may be used. Especially good results have been obtained with a roller mill or with a ball mill.

The following examples illustrate the invention, the parts being by weight:—

Example 1

500 parts of calcium cyanamide, containing 20 per cent. of amide nitrogen, together with 1800 parts of water, are introduced into a tube mill; while the mass is thoroughly ground hydrogen sulfide is introduced into the mill until no more of it is absorbed. The gaseous over-pressure is kept under 1 atmosphere. The temperature developed amounts to about 50° C.

The sulfide of polysulfide of calcium formed in addition to the thiourea is decomposed by addition of sulfuric acid. The hydrogen sulfide evolved is conducted into another apparatus containing calcium cyanamide. The calcium sulfate is separated and filter-pressed. The liquor and filtrate are evaporated to crystallize the thiourea.

The yield is 256 parts of thiourea, corresponding with 95 per cent. of the theoretical amount in respect of the amide nitrogen.

Example 2

1000 parts of calcium cyanamide, containing 20 per cent. of amide nitrogen, and 3000 parts of water are charged into a tube mill. While thoroughly grinding the mass, hydrogen sulfide is introduced into the mill until no more is absorbed. The calcium sulfide formed is decomposed with carbon dioxide and the whole is then filtered.

The hydrogen sulfide evolved is used in making a fresh batch of thiourea.

The yield of thiourea is nearly quantitative.

Example 3

Into a mixture of 250 parts of calcium cyanamide, containing 20 per cent. of amide nitrogen, and 1000 parts of water carbon dioxide and hydrogen sulfide are simultaneously introduced until the mass is saturated. As in the case of Examples 1 and 2 thorough grinding in a tube mill is applied during the reaction. The calcium carbonate formed is separated by filtration and the filtrate is evaporated.

128 parts of thiourea are produced corresponding with 95 per cent. of the theoretical amount.

Example 4

Into 2000 parts of calcium cyanamide, containing 20 per cent. of amide nitrogen, and 6000 parts of water contained in a tube mill, 510 parts of hydrogen sulfide are introduced, which amounts to about one-fourth of the amount of hydrogen sulfide gas necessary for complete saturation as described in Example 1, that is to say for converting the amide nitrogen into thiourea and the calcium into calcium sulfide.

The operation occupies about 10 minutes, whereupon for the purpose of liberating hydrogen sulfide from the calcium sulfide produced and converting the rest of the amide nitrogen into thiourea, 2600 parts of sulfuric acid of 77 per cent. strength are added while grinding is continued. The calcium sulfate is filtered and the filtrate is concentrated.

The yield amounts to 1030 parts of thiourea corresponding with 95,5 per cent. of the theoretical amount.

Example 5

900 parts of calcium cyanamide having a total nitrogen content of 20 per cent. are ground in a tube mill, together with 700 parts of calcium sulfide and 1000 parts of water.

Carbon dioxide is introduced, whereby heat is developed.

After 15 minutes the reaction is complete. The contents of the mill are filtered and from the filtrate the thiourea is crystallized. Secondary products are substantially absent, and the yield is 99 per cent., calculated with reference to the amide-nitrogen content of the calcium cyanamide.

Example 6

180 parts of calcium cyanamide are caused to react in a tube mill with 140 parts of calcium sulfide with gradual addition of 3700 parts of sulfuric acid of 10 per cent. strength. The operation of the mill produces a thorough grinding whereby the reaction is hastened and becomes substantially quantitative.

The thiourea is isolated as described in Example 5.

Example 7

600 parts of calcium cyanamide and 1500 parts of barium sulfide of 60 per cent. strength and 800 parts of water are mixed and the mixture is ground finely in a ball mill into which carbon dioxide is introduced.

When the reaction is complete the thiourea is crystallized from the solution obtained by filtering the mass. The yield is similar to that obtained by the process described in the preceding examples.

Example 8

900 parts of calcium cyanamide, 700 parts of calcium sulfide and 8600 parts of primary sodium phosphate (Na$_3$PO$_4$.12aq) are ground together in a tube mill; the reaction occurs nearly quantitatively.

When the reaction is complete the whole is neutralized with dilute sulfuric acid and the thiourea is isolated by extraction, for instance, with alcohol.

While we have indicated the preferred form of our improved process with several lines of variation therein, it is understood, that numerous other changes and deviations, for instance in the kind and proportions of the ingredients used, in the mode of the addition of the ingredients, in the temperature or pressure adopted or in the grinding devices employed and the like, can be made by those skilled in the art without departing from the scope of the invention as set forth in the following claims:—

1. The method of preparing thiourea which comprises intimately admixing an alkaline earth metal salt of cyanamide, water, and a potential source of hydrogen sulfide, and thoroughly grinding the resultant admixture while subjecting it to the action of a reagent adapted to liberate hydrogen sulfide and to precipitate an insoluble alkaline earth metal salt therefrom, whereby a substantially quantitative yield of thiourea is produced within a reaction period ranging approximately between 10 and 15 minutes and substantially no secondary reaction products are formed.

2. The method of preparing thiourea which comprises intimately admixing an alkaline earth metal salt of cyanamide, water, and a sulfide of the group consisting of hydrogen sulfide and the alkaline earth metal sulfides, and thoroughly grinding the resultant admixture while subjecting it to the action of a reagent adapted to precipitate an insoluble alkaline earth metal salt therefrom, whereby a substantially quantitative yield of thiourea is produced within a reaction period ranging approximately between 10 and 15 minutes and substantially no secondary products are formed.

3. The method of preparing thiourea which comprises thoroughly grinding an alkaline earth metal salt of cyanamide in water while subjecting it to the action of hydrogen sulfide, and subjecting the resulting admixture, while still thoroughly grinding, to the action of a reagent adapted to precipitate an insoluble alkaline earth metal salt therefrom, whereby a substantially quantitative yield of thiourea is produced within a reaction period ranging approximately between 10 and 15 minutes and substantially no secondary products are formed.

4. The method of preparing thiourea which comprises thoroughly grinding an admixture of an alkaline earth metal salt of cyanamide, water, and an alkaline earth metal sulfide, and subjecting the resulting admixture, while still thoroughly grinding, to the action of a reagent adapted to precipitate an insoluble alkaline earth metal salt therefrom, whereby a substantially quantitative yield of thiourea is produced within a reaction period ranging approximately between 10 and 15 minutes and substantially no secondary products are formed.

5. The method of preparing thiourea which comprises thoroughly grinding calcium cyanamide in water, saturating the mixture with hydrogen sulfide, and subjecting the resultant admixture, while still thoroughly grinding, to the action of a reagent adapted to precipitate an insoluble calcium salt therefrom, whereby a substantially quantitative yield of thiourea is produced within a reaction period ranging approximately between 10 and 15 minutes and substantially no secondary products are formed.

6. The method of preparing thiourea which comprises thoroughly grinding an admixture of calcium cyanamide, water, and calcium sulfide, and subjecting the resultant mass, while still thoroughly grinding, to the action of a reagent adapted to precipitate an insoluble calcium salt therefrom, whereby a substantially quantitative yield of thiourea is produced within a reaction period ranging approximately between 10 and 15 minutes and substantially no secondary products are formed.

7. The method of preparing thiourea which comprises subjecting calcium cyanamide to thorough grinding in the presence of water while successively saturating the mass with hydrogen sulfide and carbon dioxide, whereby a substantially quantitative yield of thiourea is produced within a reaction period ranging approximately between 10 and 15 minutes and substantially no secondary products are formed.

8. In a method of making thiourea from calcium cyanamide and hydrogen sulfide in presence of water by the action of carbon dioxide, the step of simultaneously introducing the hydrogen sulfide into the moist calcium cyanamide while thoroughly grinding the mass until the latter is saturated.

9. A process for the manufacture of thiourea from an alkaline earth metal salt of cyanamide and hydrogen sulfide in presence of water by the action of an agent of acid character which produces an insoluble alkaline earth metal salt, said process comprising introducing into the cyanamide salt and water while thoroughly grinding the mass a quantity of hydrogen sulfide which is insufficient to completely convert the amide nitrogen into thiourea, and then decomposing the resultant alkaline earth metal sulfide by adding the said acid agent, whereby sufficient hydrogen sulfide is liberated to effect substantially quantitative conversion into thiourea of unconverted amide nitrogen.

10. A process for the manufacture of thiourea from an alkaline earth metal salt of cyanamide and hydrogen sulfide in the presence of water by the action of an agent of acid character which produces an insoluble alkaline earth metal salt, said process comprising initially introducing into the cyanamide salt and water while thoroughly grinding the mass, a quantity of hydrogen sulfide which is sufficient to convert the total amide nitrogen into thiourea and the alkaline earth metal into alkaline earth metal sulfide, then adding said acid agent, whereby a substantially quantitative yield of thiourea is obtained the alkaline earth metal sulfide is converted into an insoluble alkaline earth salt and hydrogen sulfide is liberated, and collecting the liberated hydrogen sulfide for use in making a further batch of thiourea.

ALPHONSE GAMS.
WERNER MERKI.